US 8,748,338 B2

(12) United States Patent
Luthy et al.

(10) Patent No.: US 8,748,338 B2
(45) Date of Patent: Jun. 10, 2014

(54) POLYSULFIDE-RUBBER-COATED ACTIVATED CARBON (PSR-AC) AS A MULTI-SORBENT FOR MERCURY AND POLYCHLORINATED BIPHENYLS (PCBS)

(75) Inventors: Richard G. Luthy, Stanford, CA (US); Eun Ah Kim, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 303 days.

(21) Appl. No.: 13/317,555

(22) Filed: Oct. 21, 2011

(65) Prior Publication Data

US 2012/0108420 A1     May 3, 2012

Related U.S. Application Data (60) Provisional application No. 61/455,994, filed on Oct. 29, 2010.

(51) Int. Cl.
*B01J 20/26*     (2006.01)
(52) U.S. Cl.
USPC .............................. 502/402; 502/417; 524/495
(58) Field of Classification Search
USPC .................................. 502/402, 417; 524/495
See application file for complete search history.

(56) References Cited

U.S. PATENT DOCUMENTS 4,476,169 A * 10/1984 Nishino et al. .................. 428/34
7,595,360 B2 * 9/2009 Sandstrom .................... 524/493

* cited by examiner

*Primary Examiner* — Stuart Hendrickson
(74) *Attorney, Agent, or Firm* — Lumen Patent Firm (57) ABSTRACT

A toxin immobilization particle and method of fabrication is provided that includes a polysulfide-rubber polymer coated activated carbon particle that provides enhanced toxin adsorption. A porous activated carbon particle have a size range up to 2 mm is used. The polysulfide-rubber polymer coated activated carbon particle includes a polymer-dose range of up to 1.64 grams of sulfur per gram of activated carbon particles, where the toxins can include mercury, PCBs, chlorinated pesticides or polycyclic aromatic hydrocarbons. The method of forming the toxin immobilization particle includes condensing a polymer in a sulfide mixture to form a polysulfide-rubber polymer compound and coating an activated carbon particle with the polysulfide-rubber polymer. The levels of sulfur loading in the toxin immobilization particles are controlled by the polymer dose during the coating process, where the polysulfide polymer coated activated carbon particle provides enhanced toxin adsorption.

12 Claims, 10 Drawing Sheets

POLYSULFIDE-RUBBER-COATED ACTIVATED CARBON (PSR-AC) AS A MULTI-SORBENT FOR MERCURY AND POLYCHLORINATED BIPHENYLS (PCBS)

CROSS-REFERENCE TO RELATED APPLICATIONS

This application claims priority from U.S. Provisional Patent Application 61/455,994 filed Oct. 29, 2010, which is incorporated herein by reference.

STATEMENT OF GOVERNMENT SPONSORED SUPPORT

This invention was made with Government support under contract R01 ES016143-02 awarded by National Institute of Environmental Health Sciences. The Government has certain rights in this invention.

FIELD OF THE INVENTION

The invention relates to environmental toxin sequestration. In particular, the invention relates to environmental toxin immobilization particles and methods of fabrication.

BACKGROUND OF THE INVENTION

Mercury ions exist in the environment as complex with inorganic and organic ligands or stabilized with sulfide ions forming cinnabar. Although inorganic mercury is less toxic than methylmercury or dimethylmercury, it is imperative that its concentration in sediment and waters be kept low since neutral dissolved inorganic mercury, such as neutral chloride species, can be transformed by sulfate reducing bacteria into toxic and bioaccumulative methylmercury or dimethylmercury. Much effort has been expended on developing techniques for mercury removal from water such as precipitation with elemental sulfur, ion exchange, membrane separation, and adsorption with zeolites, nanoparticles, and activated carbons.

Utilizing an adsorbent such as zeolite or activated carbon has drawn attention for economical reasons. Since sulfur has a high affinity for mercury, reduced sulfur functional groups, such as sulfide, thiol, and elemental sulfur, have been incorporated into adsorbents to enhance mercury sorption efficiency.

Sulfur-impregnated activated carbon enhances mercury removal efficiency from flue gas and from the aqueous phase. A general method for activated carbon sulfur impregnation is to treat the activated carbon with a mercury adsorbent such as elemental sulfur, polysulfide ($S_x^{2-}$), thiol, or polythiol at high temperature (200-600° C.). Hg(0) removal efficiency on sulfur-impregnated activated carbon is dependent on sulfur impregnation method and temperature as well as the resulting micropore area of the sulfur-impregnated activated carbon. However, found that more than 20% of the elemental sulfur loading on activated carbon at reaction temperatures above 400° C. resulted in the loss of mercury removal efficiency due to the generation of less reactive sulfur species, blocking pores and reducing reactive surface area by the excessive sulfur loading. What is needed is are porous, low-cost and effective environmental toxin remediation particles that can be readily fabricated.

SUMMARY OF THE INVENTION

To address the needs in the art, a toxin immobilization particle is provided that includes a polysulfide-rubber polymer coated activated carbon particle that provides enhanced toxin adsorption.

According to one aspect of the invention, the activated carbon particle is a porous activated carbon particle.

In another aspect of the invention, carbon particles have a size range up to 2 mm.

In a further aspect of the invention, the polysulfide-rubber polymer coated activated carbon particle includes a polymer-dose range of up to 1.64 grams of sulfur per gram of activated carbon particles.

In another aspect of the invention, the toxins can include mercury, polychlorinated biphenyls, chlorinated pesticides or polycyclic aromatic hydrocarbons.

In one embodiment, a method of forming a toxin immobilization particle is provided that includes condensing a polymer in a sulfide mixture to form a polysulfide-rubber polymer compound and coating an activated carbon particle with the polysulfide-rubber polymer, where the polysulfide polymer coated activated carbon particle provides enhanced toxin adsorption.

According to one aspect of the method, synthesizing the polymer in the sulfide mixture includes using condensation polymerization between sodium tetrasulfide and 1,2-dichloroethane in water.

In a further aspect of the method, the activated carbon particle is a porous activated carbon particle.

In yet another aspect of the method, the activated carbon particles have a size range up to 2 mm.

According to one aspect of the method, the polysulfide-rubber polymer coated activated carbon particle includes a polymer-dose range of up to 1.64 grams of sulfur per gram of the activated carbon particles.

In a further aspect of the method, coating the activated carbon particle with the polysulfide-rubber polymer includes refluxing a polysulfide-rubber polymer in toluene, where the polymer is dissolved, cooling the refluxed polysulfide-rubber polymer, adding the activated carbon particle to the cooled refluxed polysulfide-rubber polymer, mixing and refluxing polysulfide-rubber polymer with activated carbon, cooling the mixed and refluxed polysulfide-rubber polymer with activated carbon, mixing activated carbon particle in the cooled refluxed polysulfide polymer, where the particle is coated with the cooled refluxed poly sulfide polymer, and collecting and drying the coated polysulfide polymer coated activated carbon particle.

In yet another aspect of the invention, levels of sulfur loading in the toxin immobilization particles are controlled by the polymer dose during the coating process.

DETAILED DESCRIPTION

An effective toxin removal method using polymer-coated activated carbon is provided for use in water treatment. In this description of the invention, toxin can include mercury, PCBs, chlorinated pesticides and polycyclic aromatic hydrocarbons. Example descriptions are provided using mercury, but it is understood that other toxins are applicable to the invention.

In order to increase the affinity of activated carbon for mercury, a sulfur-rich compound, polysulfide-rubber (PSR) polymer, is coated onto the activated carbon. The polymer is synthesized by condensation polymerization between sodium tetrasulfide and 1,2-dichloroethane in water. Sample PSR-mercury interactions and Hg—S bonding were elucidated from x-ray photoelectron spectroscopy, and Fourier transform infra-red spectroscopy analyses. The sulfur loading levels are controlled by the polymer dose during the coating process and the total surface area of the activated carbon was maintained for the sulfur loading less than 2 wt %. Sorption kinetic studies showed that the PSR-coated activated carbon of the current invention facilitates fast reaction by providing a greater reactive surface area than PSR alone. High sulfur loading on activated carbon enhanced mercury adsorption contributing to a three orders of magnitude reduction in mercury concentration. μ-X-ray absorption near edge spectroscopic analyses of the mercury bound to activated carbon and to PSR on activated carbon shows the chemical bond with mercury on the surface is a combination of Hg—Cl and Hg—S. The pH effect on mercury removal and adsorption isotherm results indicate competition between protons and mercury for binding to sulfur at low pH.

According to the current invention, surface modification of the inner pores of activated carbon is provided for effective mercury immobilization in that the mercury species can be sequestered in the pores and physically isolated from influences of the outer environment, such as microbial transformation. Procedures involving the functional group modification of the activated carbon itself may be difficult. Alternatively, impregnation of mercury sorbent, such as by a polysulfide coating process, is provided where, the sulfur content is directly related with reactive surface area and thus improve mercury removal efficiency. A surface coating method to control the sulfur content, according to one embodiment of the invention, allows provision for an optimal sulfur loading level. In this regard, the incorporation of polysulfide-rubber polymer on activated carbon is provided as an effective mercury sorbent.

Having numerous S—S linkages, polysulfide-rubber itself is expected to be a strong mercury adsorbent. Furthermore, increasing the surface area of mercury binding sites by coating the polymer on highly porous activated carbon would increase the sorption capacity per mass of the polymer. Since natural organic matter in sediments is known to reduce mercury bioavailability, the current invention provides a surface coating of polysulfide-rubber that acts as a surrogate for sulfur-rich natural organic matter, and exhibits a comparable performance in reducing mercury bioavailability. The current invention provides a method for producing sulfur-rich activated carbon, and demonstrates greatly enhanced mercury ion removal efficiencies by using polysulfide rubber (PSR) coated activated carbon.

Regarding the polymer synthesis, one embodiment of the invention includes condensation polymerization between sodium tetrasulfide and 1,2-dichloroethane, using methyltributylammoniumchloride as a phase transfer catalyst, which produces a yellowish elastic solid in water. The polymer block is boiled twice in deionized water for one day each to remove residual salts. The polymer was dried in an oven at 105° C. over night.

According to one embodiment of the invention, the activated carbon is polymer coated, where 0.5-2.0 g of the polysulfide polymer in 200 mL toluene is refluxed for 3 h. After the complete dissolution of the polymer, the solution is cooled to room temperature to which 1 g of the activated carbon was added. The slurry is stirred for 24 h, and collected by vacuum filtration on a Teflon membrane filter while rinsed with toluene. The filtered activated carbon is dried under vacuum at 50° C. until constant mass. The modified activated carbon was characterized by BET (Coulter SA 3100) to estimate the changes in the pore size distribution and surface area.

To demonstrate the efficacy of the invention, mercury solutions with and without sorbent were shaken at 300 rpm. One mL of duplicate samples was taken at each time point and filtered through 0.45 μm polyvinylidene fluoride (PVDF) membrane filter. The filtrate was oxidized with 0.5% BrCl in order to stabilize the mercuric ion. The samples were diluted by 400-80000-fold to ensure mercury concentrations were within the detection range of 0.5-400 ng $L^{-1}$. The total mercury concentrations were measured by Tekran 2600 cold vapor atomic fluorescent spectrometry (CVAFS) following the US EPA (Environmental Protection Agency) method 1631 revision E.

Ten mg of PSR as a sole sorbent of mercury was prepared by dissolving the polymer in toluene and coating on glass vials by evaporating toluene. Ten ppm $HgCl_2$ aqueous solution was prepared by dilution of 1.2 mL concentrated (8.11 g Hg $L^{-1}$) $HgCl_2$ solution in 1 L of 0.01 M pH 7 phosphate buffer solution.

Ten mg of virgin activated carbon or PSR-coated activated carbon of various sulfur contents was placed in each 40 mL vial to show the effect of polymer content and pH on mercury adsorption capacity; 10 ppm $HgCl_2$ solution was in contact with each sorbent. Sodium biphthalate was used to prepare solutions at pH 3 and 4, potassium monophosphate for pH 7, and sodium bicarbonate for pH 11.

For adsorption kinetics of activated carbon, 30 mg adsorbent was placed to a 200 mL 15 ppm $HgCl_2$ solution and shaken for 30, 60, 720, and 1440 min. Initial $HgCl_2$ aqueous solutions varying from 1 to 100 ppm in 0.01 M pH 7 phosphate buffer were used for adsorption isotherm studies. Ten mg of adsorbents were put into duplicate 40 mL glass vials. The vials were shaken at 300 rpm for 2 weeks.

The mercury bound virgin AC and AC-PSR samples used for μXRF and μXANES analyses were prepared by putting 10 mg of virgin AC or AC-PSR (S: 8.03 or 2.58 wt %) in 10 ppm $HgCl_2$ solution at pH 1, 7, and 13 for 1 month after which the particles were filtered, washed with DI-water, and dried in a glove box.

AC-PSR (S: 8.03 wt %) before and after the 10 ppm mercuric ion contact for one month was washed with MilliQ water and acetone followed by drying in a vacuum for 10 min. PHI 5000 Versa-Probe scanning XPS microprobe with Al Kα x-ray radiation (1486 eV) was used under high vacuum condition (below $1\times10^{-5}$ Pa). Charging effects by the poor surface conductivity were minimized by applying a 10 eV argon ion gun. Analytical sample size for both survey and high resolution scans was 1000×1000 μm. An averaged spectrum from five survey scans over 0-1000 eV was obtained with a resolution of 1 eV. The high-resolution spectra of S 2p orbital was obtained from 10 scans over 150-170 eV with a resolution of 0.1 eV.

Micro-XRF images were obtained on AC-PSR (S: 8.03 wt %) and virgin AC samples at beam line 2-3, and Hg μ-XANES spectra were obtained at select spots of the samples.

This beam line is equipped with a bend magnet and a double crystal (Si 111) monochromator that delivers microfocused X-rays of 5×5 μm spot size. The AC-PSR sample was imaged at 12500 eV for Hg (L3 edge) and S utilizing 0.005 step size and 100 ms dwell time per pixel; fluorescence intensities of Hg and S were monitored with a seven element Ge solid-state detector placed 45° to the sample (90° to the incident beam). In addition to the element-specific images, Hg μ-XANES spectra were obtained at select locations of Hg 'hotspots' and areas where Hg was less abundant.

Five windows of 100 eV width were monitored in the region 2000-2500 eV, which picked up fluorescence intensities from S and Hg (S: $ka_1$, $ka_2$ (2306.6 and 2307.8 eV) and Hg: $Ma_1$ 2195.3 eV). XRF standards of S ($CuS_x$ S=11.8 μg/m2) and Hg (AgHg Hg=27.5 μg/m2) were imaged at 12500 eV. The relative counts in each of the windows (2000-2100, 2100-2200, 2300-2400, 2400-2500 eV) from each of the standards were used to fit the sample data from each of those windows to produce fitted maps of S and Hg, which were free of depth effects of X-rays coming out of the sample that differ for S and Hg. The fitted S and Hg maps were then quantified using the AgHg and $CuS_x$ standards to produce maps in units of μg/cm². First derivatives of normalized edge spectra were fitted in the region from 12250 to 12355 eV with two standards that may be present in the sample: $HgCl_2$ and HgS (metacinnabar). Mercuric chloride was analyzed as a freshly-prepared solution and metacinnabar was analyzed as a solid.

Polysulfide-rubber polymer has repeating $C_2H_4S_4$ units with a termination group of —$C_2H_4Cl$. $^1H$ and $^{13}C$ NMR and FT-IR spectra of the synthesized polysulfide agree with previous data. Appearance of new peaks in FT-IR spectra between 1500 and 800 $cm^{-1}$, which are absent in 1,2-dichloroethane spectrum, suggest the formation of C—S bonds. Disappearance of the proton peak corresponding to $CH_2Cl$ in $^1H$ NMR spectra also supports the assertion that the polymerization reaction was successful. The relative peak area ratio of $CH_2Cl:CH_2S_4$=1:16, which corresponds to a molecular weight of about 2600 g/mol. The C:H:S mass ratio of the polymer obtained from CHNS/O analysis is 15:3:82, which is equivalent to the $C_2H_4S_4$ formula.

Figure 1:
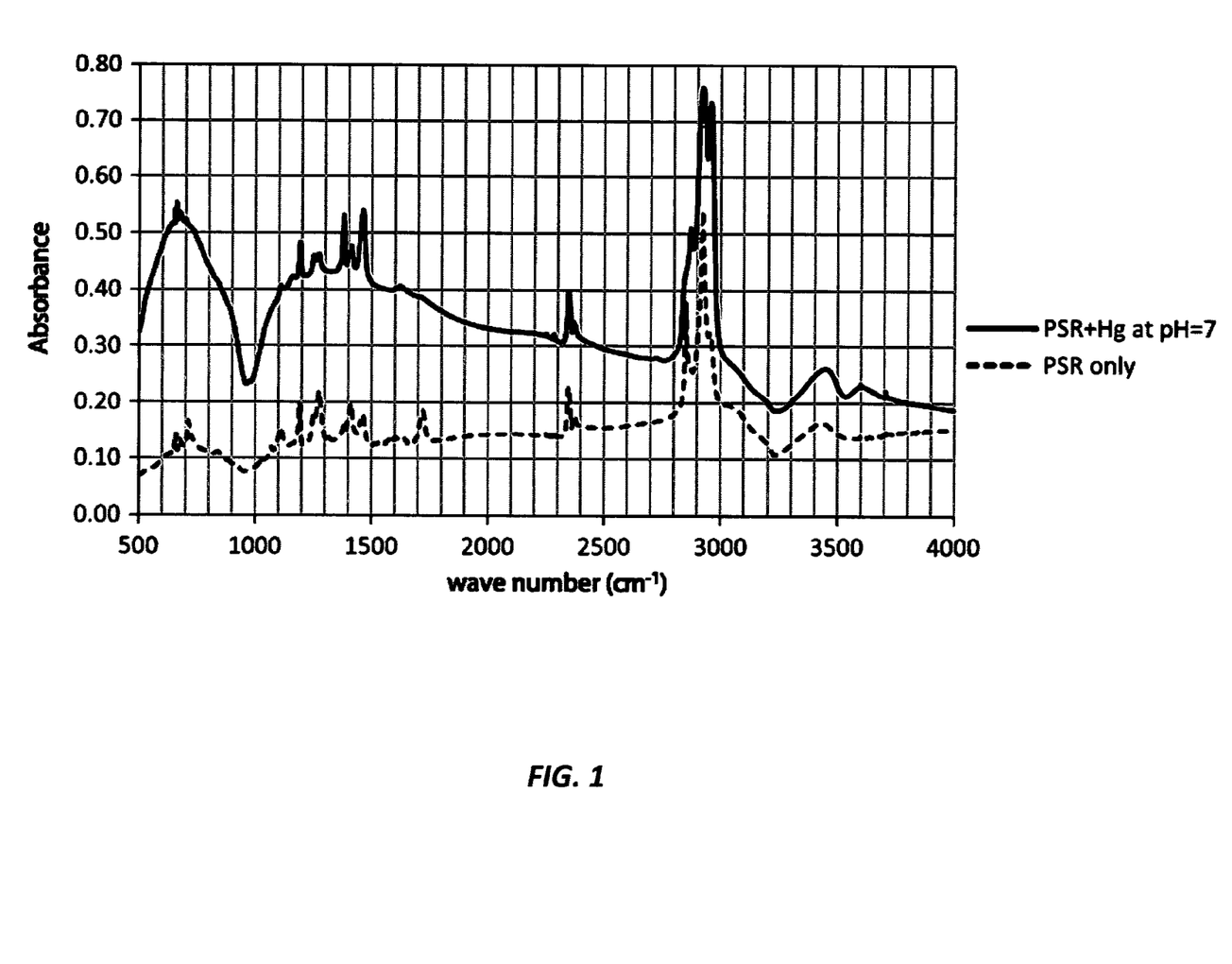
FIG. 1 shows FT-IR spectra of PSR polymer with and without mercuric chloride, according to one embodiment of the invention.

The FT-IR spectra shown in FIG. 1 compare PSR before and after the contact with $HgCl_2$. This shows that the chemical environment around the $CH_2$ groups in PSR polymer has been changed by the mercury input. The disappearance of the peak at 711.6 $cm^{-1}$ after the mercury input suggests changes in the nature of C—S bonding, while relative intensity changes at 1350-1500 $cm^{-1}$ and 2800-3000 $cm^{-1}$ indicate different $CH_2$ bending vibration and C—H stretching energy due to changes in $CH_2$—S bonding energy. These results support the engagement of mercury with sulfur atoms by which the process draws electrons from the sulfur and consequently replenishing the loss from the neighboring C—S bond.

Figure 2:
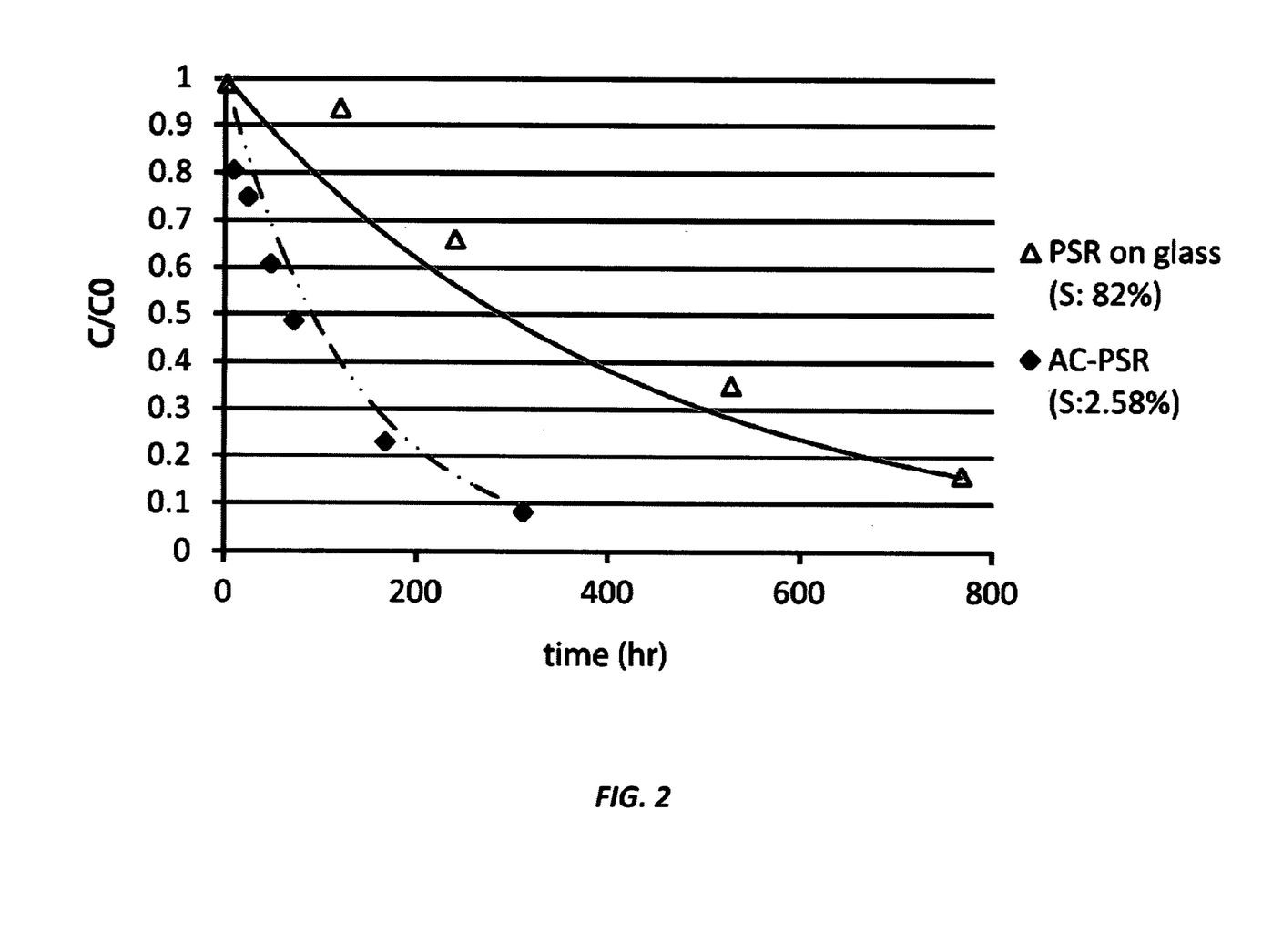
FIG. 2 shows mercury adsorption kinetics with a PSR polymer-coat on glass in comparison with AC-PSR particles for the adsorption of $HgCl_2$.

Turning to an example of mercury adsorption kinetics with PSR polymer coated on glass, the ability of PSR alone to sorb mercuric ion was demonstrated by coating PSR on glass vials and evaluating mercuric ion removed with 10 ppm mercuric chloride solution at pH7. FIG. 2 shows that PSR polymer itself can remove mercuric chloride from water as a sole sorbent, and the trend follows a first order reaction model with a single constant throughout the reaction, which may be expected when the number of mercury binding sites stays relatively constant with respect to substrate concentration. Specifically, FIG. 2 shows mercury adsorption kinetics with 10 mg PSR polymer-coat on glass (S: 82%) coated on 40 mL borosilicate glass vials in comparison with 10 mg AC-PSR particles (S: 2.58%) for the adsorption of 10 ppm $HgCl_2$ at pH=7. First order reaction rates are given by the solid or dashed line.

The PSR polymer adsorption has a different reaction mechanism from that with many to mineral-metal binding pathways wherein electrostatic forces play an important role. Since the PSR polymer has zero formal charge on the sulfur atom, and the aqueous mercury species are either in a positively charged mercuric ion or neutral $HgCl_2^0$ form, the mercury-polymer binding should be favored not by electrostatic interactions, but by formation of the molecular orbital between sulfur 3s, 3p orbitals and mercury 5d, 6s orbitals.

FIG. 2 compares mercury removal by the same weight of PSR polymer coated on glass and PSR-coated activated carbon. Both show similar trends, but the AC-PSR has a rate constant k=0.0076 $h^{-1}$, while PSR coating on glass has a much smaller rate constant k=0.0024 $h^{-1}$. The normalized constants by the sulfur mass, 29 $h^{-1}(g\ S)^{-1}$ and 0.29 $h^{-1}(g\ S)^{-1}$ respectively, show the significant role of activated carbon to increase the reaction rate. The increase of the reaction constant by increasing the surface area of the polymer suggests an enhancement of the reaction rate by providing the polymer with larger overall surface area and ample macropores in the activated carbon, which is supported by the gradual reduction of BET surface area resulting from the invasion of micropore area with the polymer (Table 1).

Figure 3A:
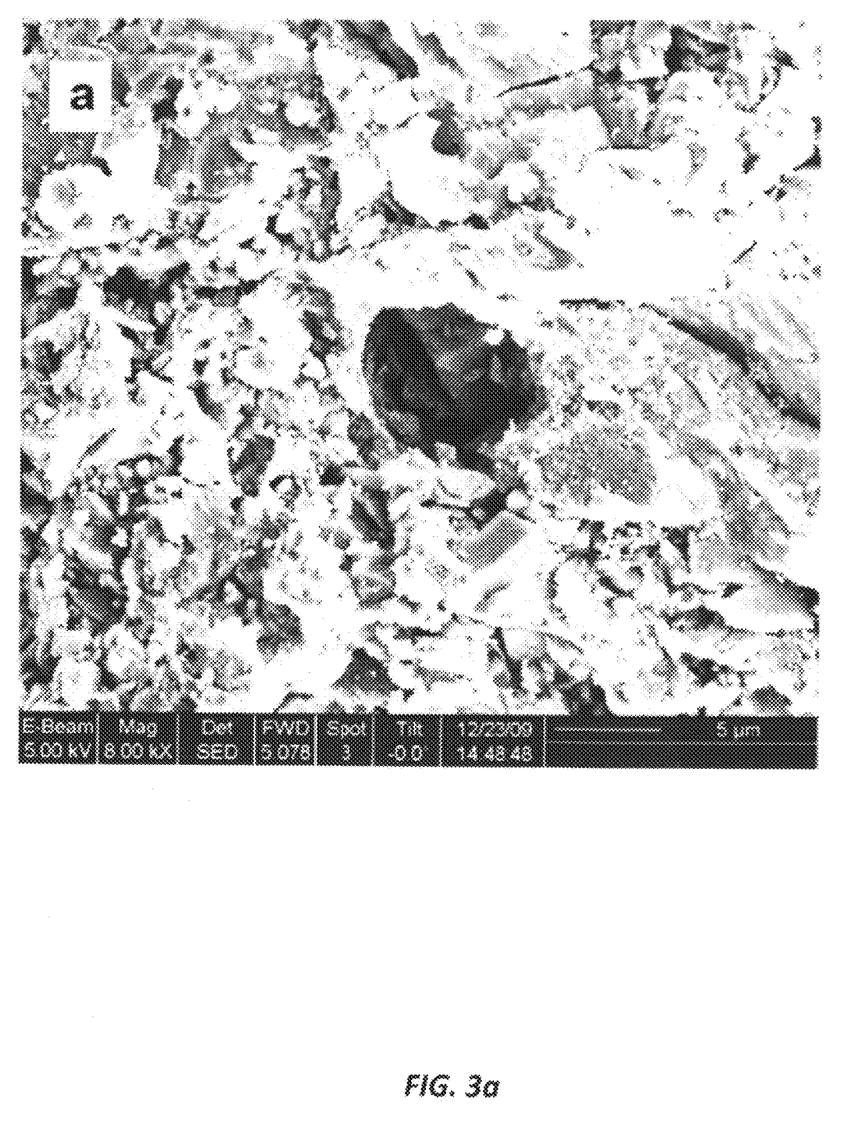
FIGS. 3a-3b show SEM images of virgin AC and PSR-coated AC, respectively, according to one embodiment of the invention.
Figure 3B:
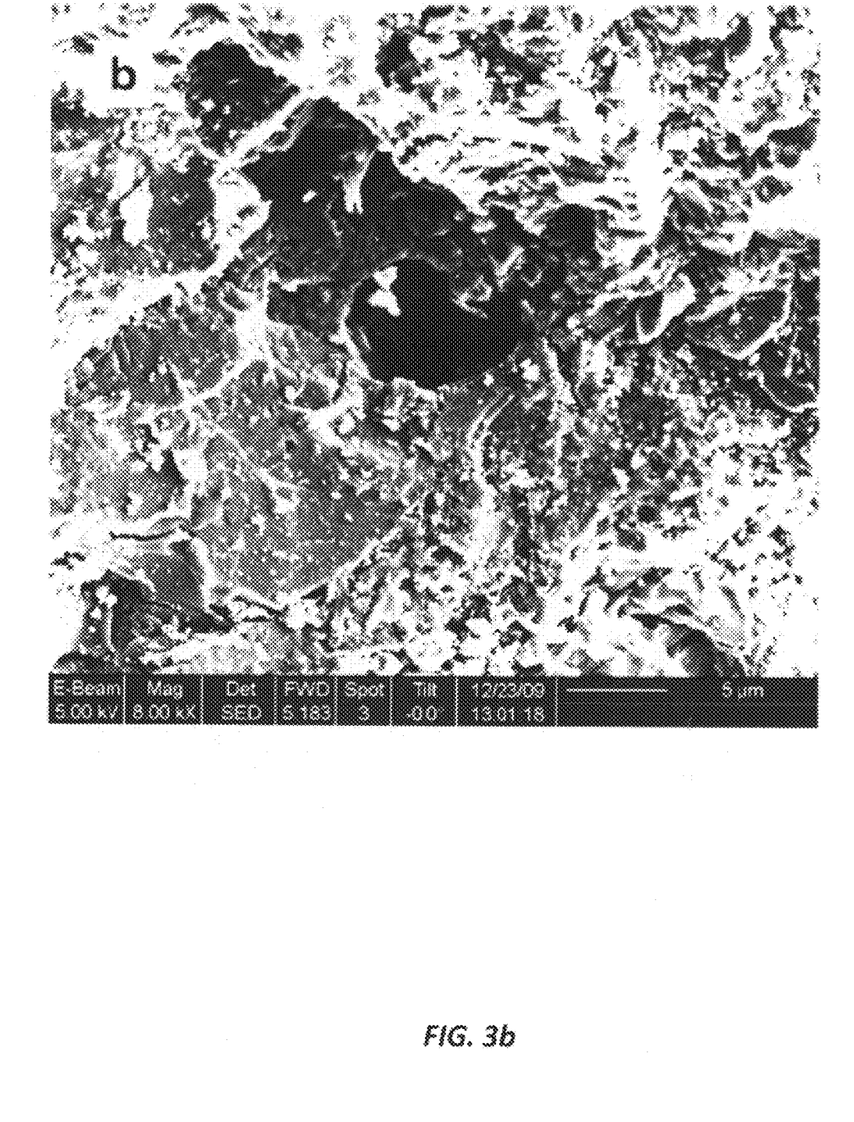

Regarding polymer coating on the activated carbon, results presented in Table 1 show trends in total and micropore surface areas as well as the sulfur content with respect to polymer dose. Within the polymer dose range of 0-1.64 g S/g AC, sulfur loading on activated carbon has a positive linear correlation with the polymer input. The total and micropore BET surface areas increase slightly to a polymer dose of about 0.41 g S/g AC and then decrease as the polymer dose increases. A small increase in the surface areas with 0-0.41 g S/g AC polymer dose may be due to the formation of polymer microclusters on the activated carbon surface or inside of the macropores. Polymer coating does not affect the overall pore structure of virgin AC as shown in FIGS. 3a-3b, where the macropore is not blocked with the high dosage of polymer (S loading: 12.65 wt %). Specifically, FIGS. 3a-3b show SEM images of a) virgin AC, and b) PSR-coated AC (Sulfur loading: 12.65 wt %), respectively. The macropore and fine structural features of activated carbon are preserved after the polymer coating.

TABLE 1

Surface area and sulfur content changes with increasing polymer dose (1 g activated carbon was used at each experiment).

| | | | | | | |
|---|---|---|---|---|---|---|
| Sulfur content (wt %) | 0.57 | 1.41 | 1.84 | 4.28 | 8.03 | 12.65 |
| Polymer dose (g S/g AC) | 0 | 0.205 | 0.410 | 0.820 | 1.23 | 1.64 |
| Total surface area ($m^2\ g^{-1}$) | 724 | 832 | 832 | 640 | 516 | 306 |
| Micropore area ($m^2\ g^{-1}$) | 433 | 530 | 519 | 346 | 237 | 102 |

Microstructures on the activated carbon are also preserved after polymer coating, while the edges and steps are locally smoothed. This indicates a thin film-like character of the polymer that enables spreading of the polymer molecules without blocking macropores.

Figure 4A:
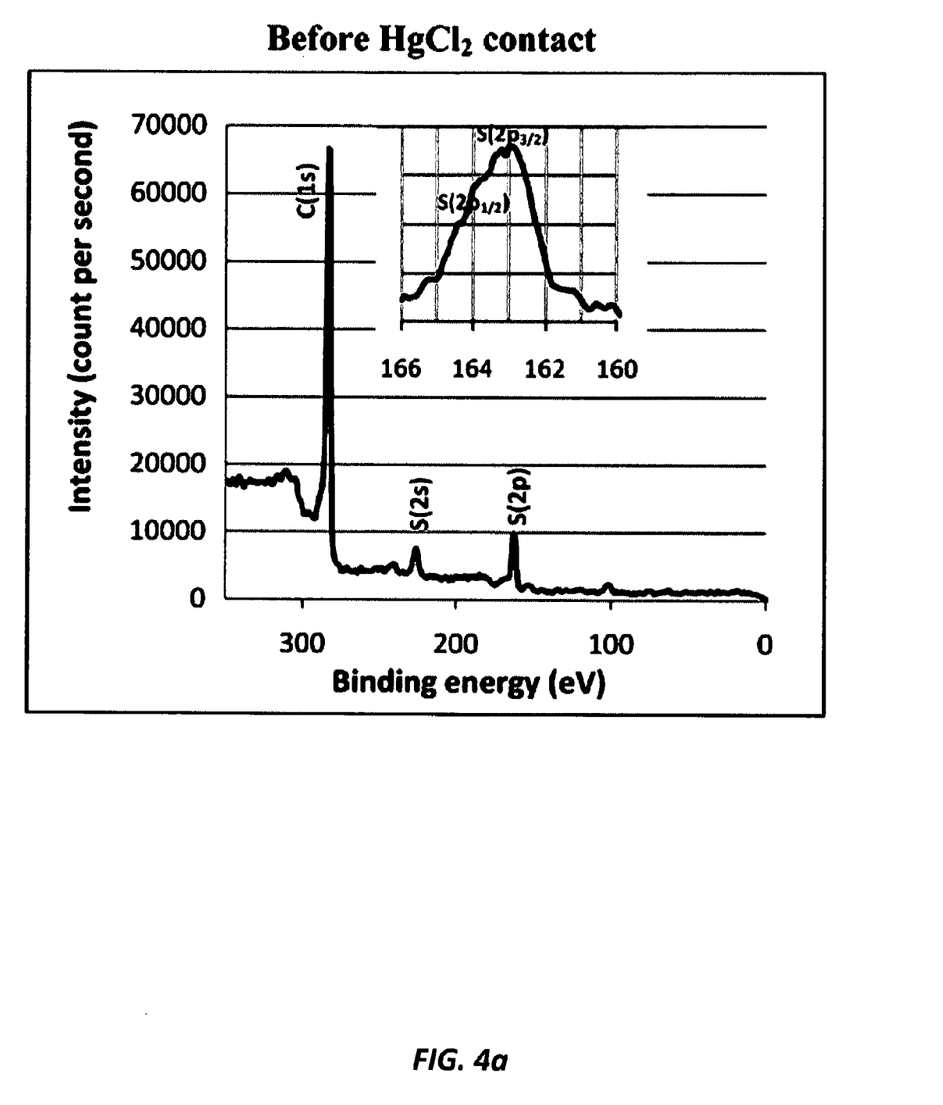
FIGS. 4a-4b show X-ray photoelectron spectroscopy of AC-PSR before and after $HgCl_2$ contact for 1 month, respectively, according to one embodiment of the invention.
Figure 4B:
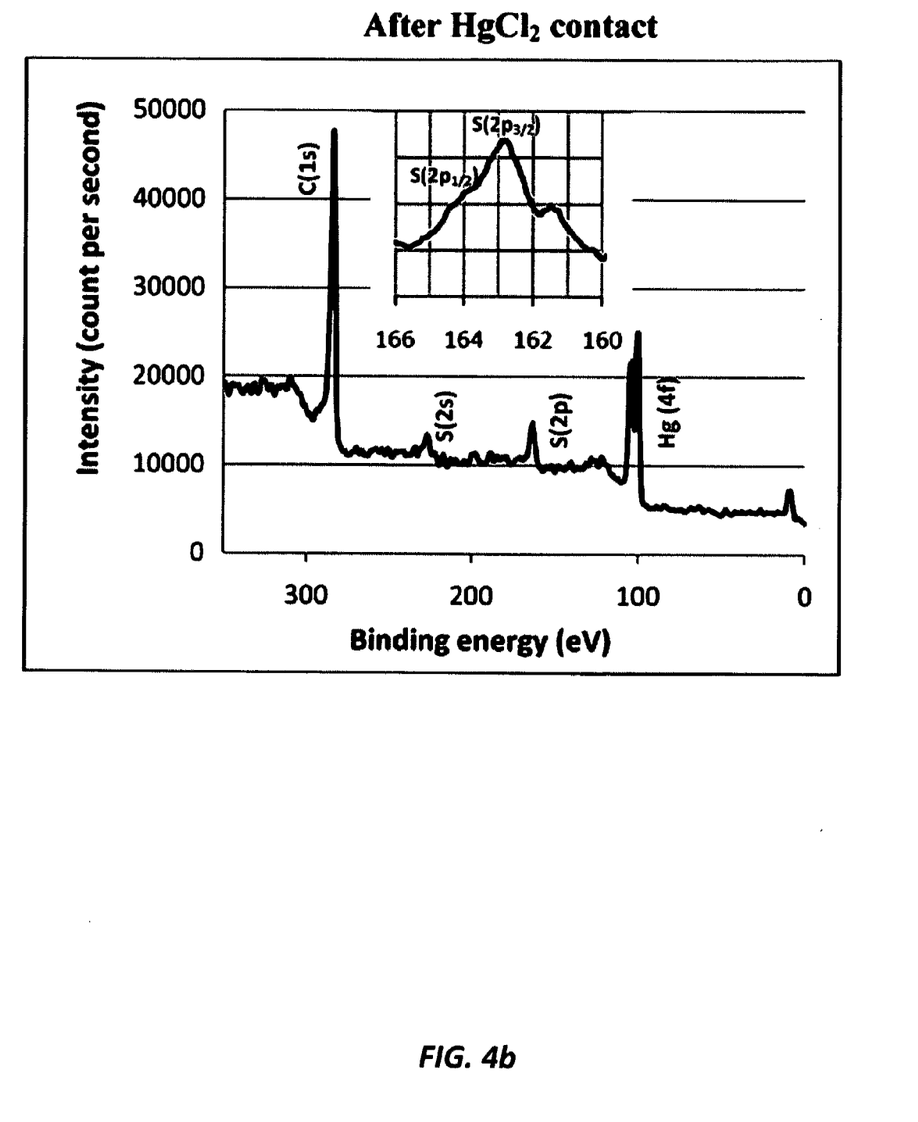

X-ray photoelectron spectroscopy (XPS) analysis is provided, where mercury immobilization on the surface is confirmed by XPS spectra of AC-PSR before and after $HgCl_2$ contact for 1 month are shown in FIGS. 4a-4b, where shown is X-ray photoelectron spectroscopy of AC-PSR (S: 8.03%) a) before and b) after $HgCl_2$ contact for 1 month, respectively. A new peak at 101 eV corresponding to Hg (4f) orbital within the range of Hg—S bond appears after the mercury contact while sulfur 2p and 2s peaks remain. The inset spectra of high resolution S (2p) orbital shows more peak area from the binding energy lower than 162 eV after the mercury contact, which indicates the newly-formed Hg—S bond. Positive bonding energy shift of S 2p1/2 orbital after aqueous mercuric ion contact can be a result of sulfur oxidation or electron transfer from S—S bond toward the neighboring Hg—S complex.

Figure 5:
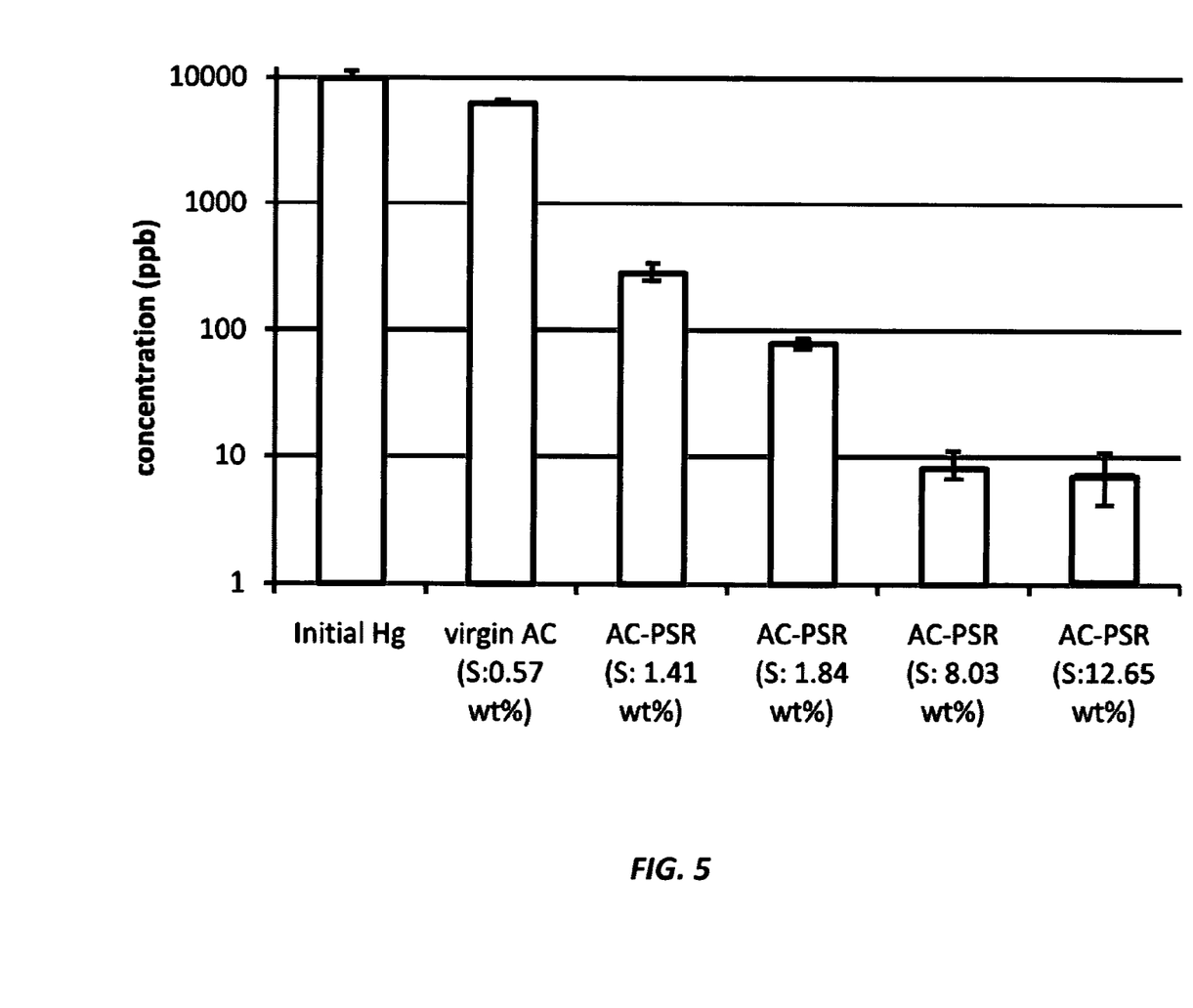
FIG. 5 shows mercury concentration remaining after 1 month of contact with virgin AC or AC-PSR having 1.41-12.65 wt % sulfur contents, according to one embodiment of the invention.

Turning now to the sulfur content and pH effects on adsorption capacities of AC-PSR, it has been reported that mercuric ion removal efficiencies on AC are reduced when the surface area decreases even though sulfur loading may increase. This is believed to be a consequence of elemental sulfur deposition restricting access to sorption sites, and the amount of reactive sulfur compounds formed by thermal treatment, such as elemental sulfur, thiophene and sulfoxide generated at different temperatures. In contrast, in this invention, the higher sulfur loading increases the mercury sorption capacity by three orders of magnitude up to a sulfur loading of 8 wt % after which the enhancement remains unchanged (FIG. 5). The difference between the previous understanding and this invention can be attributed to the different extents of pore blocking between elemental sulfur and polysulfide-rubber polymer. According to the current invention, PSR polymer reduces the surface area by covering the micropores without blocking the larger channels that $HgCl_2$ passes through, leaving the PSR accessible for binding Hg. FIG. 5 shows Mercury concentration remaining after 1 month of contact with virgin AC or AC-PSR having 1.41-12.65 wt % sulfur contents. Error bars denote the maximum and minimum values of the duplicates. Note the logarithmic scale in which PSR on activated carbon reduces Hg by three orders of magnitude compared to virgin activated carbon.

Figure 6:
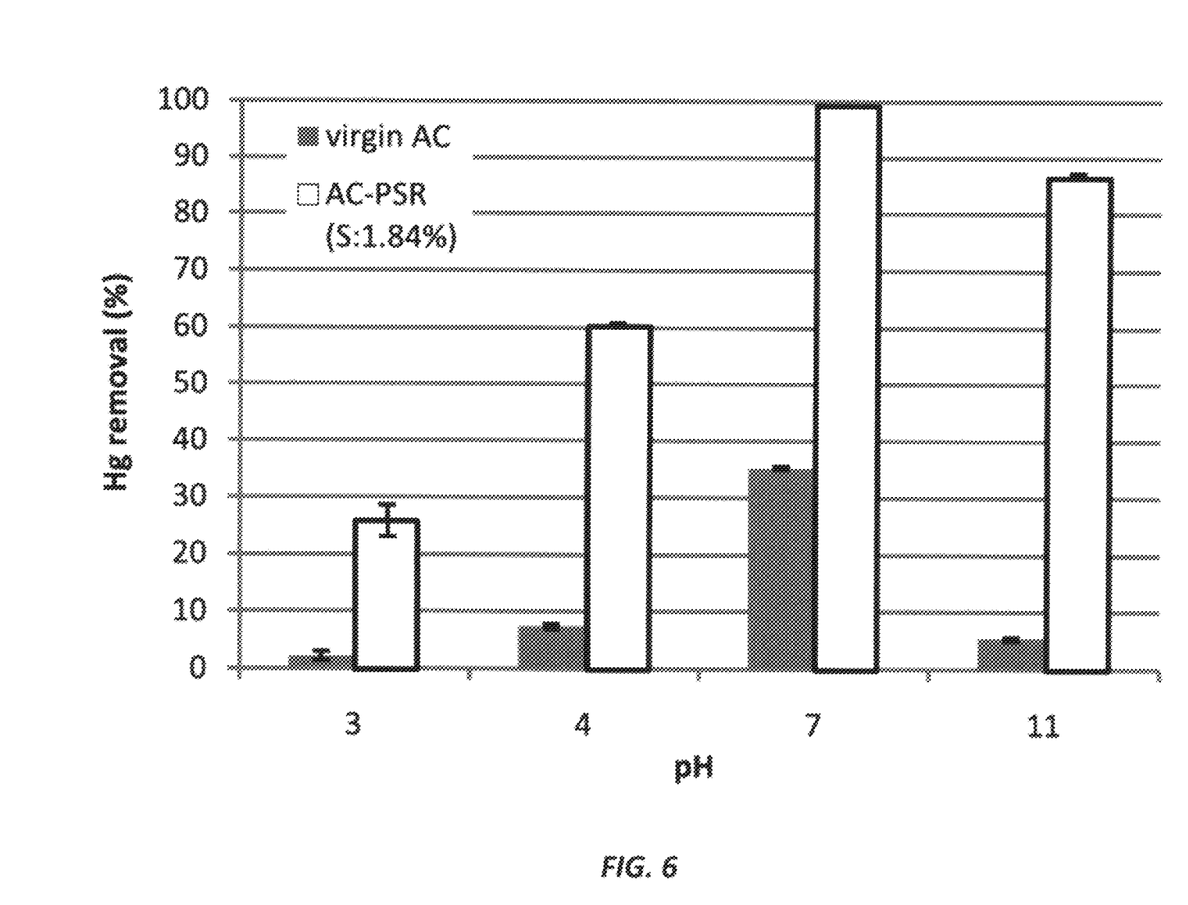
FIG. 6 shows pH effect on mercury removal capacity, according to one embodiment of the invention.

FIG. 6 shows the removal of Hg from aqueous solutions with unmodified activated carbon is greatly influenced by pH, as much as 15 fold between pH 7 and 3, where error bars denote the maximum and minimum values of the duplicates. In contrast, PSR-coated activated carbon is less affected by pH, as the decrease in the sorption capacity at pH 3 is about a factor of 4 less from that at pH 7. AC-PSR exhibits a relatively strong Hg binding tendency at high pH compared to low pH. mercuric ion speciation over pH change calculated by MINEQL$^+$ reveals that $HgCl_2$, HgClOH and $Hg(OH)_2$ are the major species in acidic, neutral and basic conditions respectively. Protonation of the sulfide chain in the polymer at low pH may explain the decreased binding with aqueous $HgCl_2$. Although polysulfide chains are less affected by high pH, the negatively charged activated carbon surface at high pH will have low affinity to neutral mercury species $Hg(OH)_2$. μXANES results of AC-PSR in contact with mercuric chloride at pH=1 showed that the majority (82-99%) of the mercury compound bound on the surface to be $HgCl_2$, which supports the understanding that the protonated polysulfide group has a very week binding affinity with mercury ions. On the other hand, μXANES results with AC-PSR in contact with $HgCl_2$ at pH=13 showed comparable binding characteristics as with AC-PSR at pH=7, mainly (64-87%) existing in the HgS form. This suggests that the decrease in mercury removal at pH=13 is not because of the chemical change at polysulfide group, but because of the changes in mercury speciation under different pH conditions.

Figure 7A:
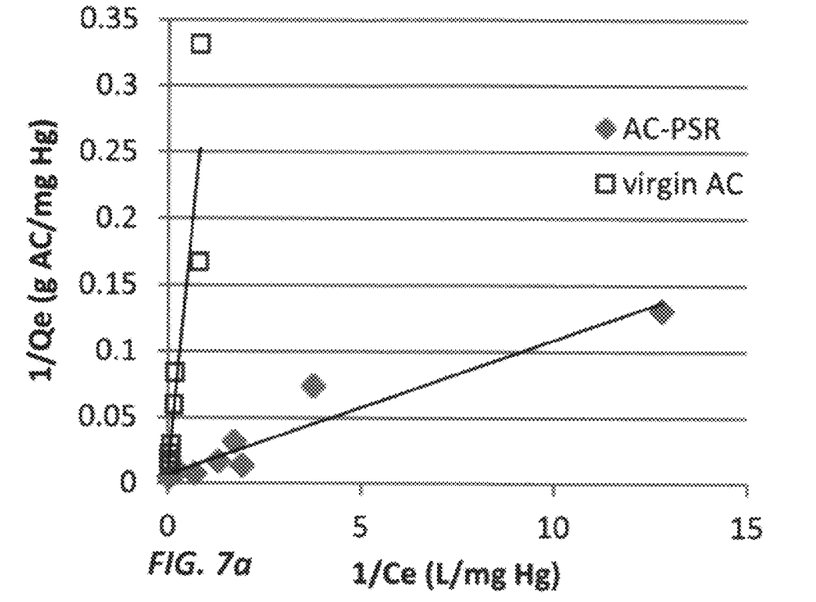
FIGS. 7a-7b show mercury adsorption isotherm fitted with Langmuir and Freundlich models, respectively, according to one embodiment of the invention.
Figure 7B:
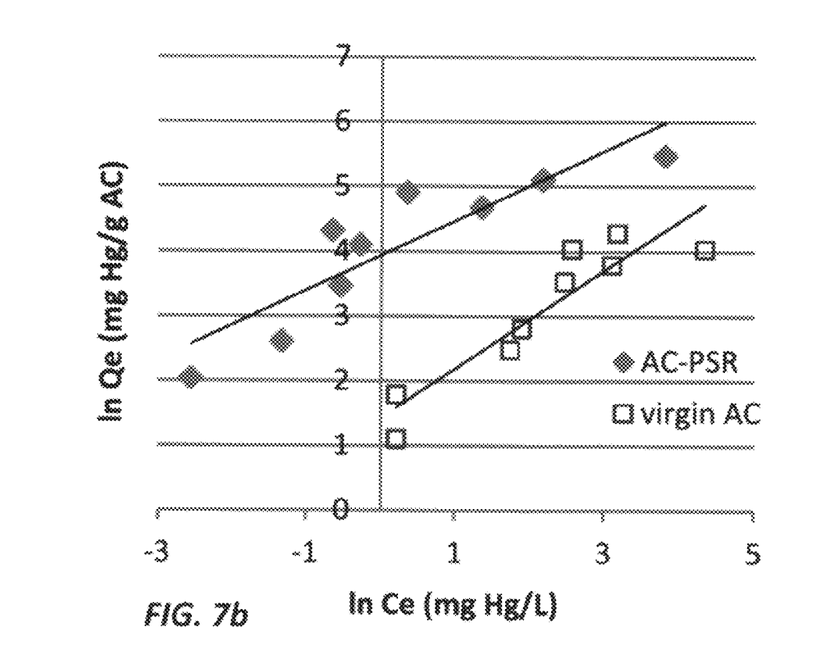

FIGS. 7a-7b show Hg adsorption isotherm data for aqueous concentration ranges to 25 mg Hg $L^{-1}$, where the adsorption isotherms are fitted with Langmuir FIG. 7a, and Freundlich FIG. 7b models (Ce: aqueous concentration of total mercury, Qe: solid concentration of total mercury in activated carbon).

Figure 8A:
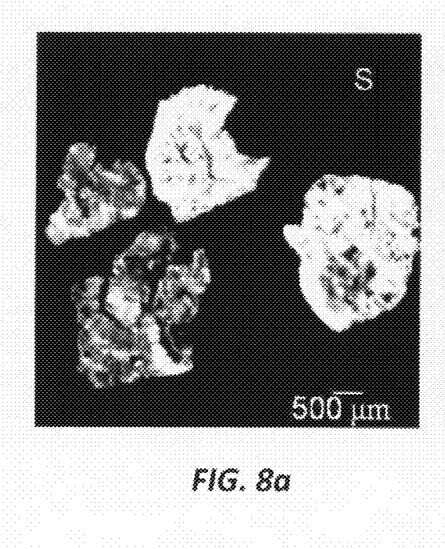
FIGS. 8a-8c show μ-XRF images of sulfur, mercury distribution, and overlay of the two images, respectively, according to one embodiment of the invention.
Figure 8B:
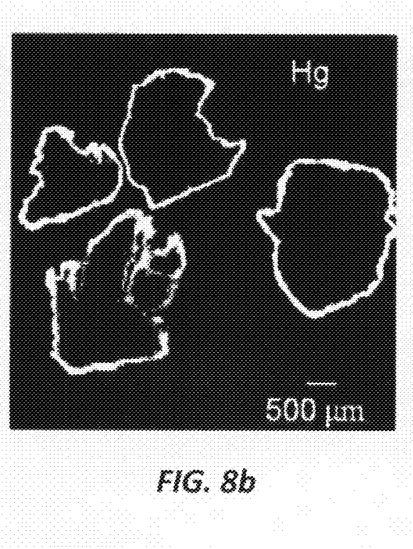
Figure 8C:
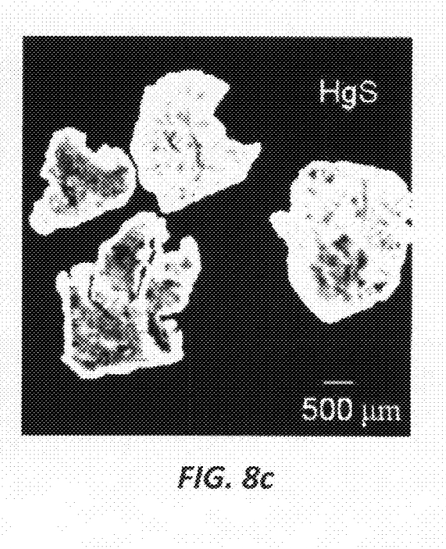

The Langmuir model fits better with the adsorption of mercury on AC-PSR, indicating that the extent of mercury binding is a function of specific binding sites, a finite number of which are located on AC-PSR surface. The most noticeable feature of the Hg adsorption isotherm is the very strong binding of Hg at low concentrations with PSR-coated activated carbon compared to virgin activated carbon. As aqueous mercury concentration goes infinite, the Hg/S ratio for AC-PSR (S: 2.58 wt %) converges to 0.9 while the Hg/S ratio for virgin AC (0.57 wt %) converges to 3.0. With AC-PSR the mercury bonding is controlled by polysulfide groups, while the sulfur group on virgin activated carbon contributes less to the maximum sorption capacity.

μ-X-ray fluorescence images shown in FIGS. 8a-8c show the distribution of sulfur and mercury across the PSR-AC particle of diameter 1-2 mm. FIG. 8a shows sulfur is uniformly distributed across the particle, while FIG. 8b shows the mercury is concentrated at about a 100 μm-deep layer. The overlay of the two images in FIG. 8c shows that the mercury layer is not a result of mercury precipitation on the particle exterior, but mercury shares the same zonation with sulfur atoms.

According to one example embodiment, the process for fabricating the material used in FIGS. 8a-8c includes refluxing one gram of the polysulfide polymer in 200 mL toluene until the polymer completely dissolved to make a homogeneous solution. The solution was cooled to room temperature and 2.0 g of the HD3000 activated carbon (Norit Inc.) was added. The slurry was refluxed for 24 hours followed by stirring at room temperature for 48 hours. The product was collected by vacuum filtration on a Teflon membrane filter and it was rinsed with toluene and methylenechloride to remove the residual polymer on the particles. The filtered AC was dried at 50° C. until constant mass.

The μ-XRF analysis includes performing synchrotron micro-X-ray fluorescence (μ-XRF) imaging on beamline 10.3.2 at the Advanced Light Source (ALS) and beamline 2-3 at the Stanford Synchrotron Radiation Lightsource (SSRL). The PSR-AC particles that reacted with mercuric chloride were dried and cured in EPOTEK 301-2FL resin. Samples were then thin sectioned to 30 μm thickness, and mounted on a quartz slides. The thin section was mapped at 12400 and 3912 eV with 40×40 μm step size at ALS.

As discussed above, the chemisorption of mercury ions on the PSR polymer is demonstrated by the characterization of chemical bonding using XPS, and FT-IR. Each spectrum exhibited newly-formed Hg—S bonding and a reduced portion of Hg—Cl bonding. The mercury removal efficiency of PSR-coated activated carbon (AC-PSR) increases as sulfur loading increases, reducing $HgCl_2$ concentration by as much as three orders of magnitude from aqueous solution buffered at pH 7. Having larger surface area, AC-PSR has 100-fold higher reaction rate per gram of sulfur than pure PSR polymer on glass. Depending on the local sulfur concentration in AC-PSR and pH of the solution, mercury ion forms various types of bonding with polysulfide groups. Adsorption isotherms show more favorable binding between mercury and AC-PSR compared with virgin AC at low aqueous concentrations. Based on these findings, effective mercury and other toxins removal from liquid phases is enabled for PSR-coated activated carbon.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, industrial waste waters with low a low level of organic constituents could be treated with PSR-AC (or AC-PSR) to reduce the total mercury concentration. PSR-AC may also be used for removing mercury from natural waters and sediments that contain natural organic matter. The material could also serve to reduce methylmercury concentration of sediment.

All such variations are considered to be within the scope and spirit of the present invention as defined by the following claims and their legal equivalents.

What is claimed:

1. A toxin immobilization particle, comprising:
   a. an activated carbon particle; and
   b. a dichloroethane-based polysulfide-rubber, wherein said polysulfide-rubber is disposed as a coating on said activated carbon particle, wherein a sulfur content in a pore of said polysulfide-rubber polymer coated activated carbon particle increases according to a concentration of said polysulfide-rubber polymer coating, wherein said polysulfide-rubber polymer coated activated carbon particle is capable of enhanced toxin adsorption.

2. The toxin immobilization particle of claim 1, wherein said activated carbon particle is a porous activated carbon particle.

3. The toxin immobilization particle of claim 1, wherein carbon particles have a size range up to 2 mm.

4. The toxin immobilization particle of claim 1, wherein said polysulfide-rubber polymer coated activated carbon particle comprises a polymer-dose range of up to 1.64 grams of sulfur per gram of activated carbon particles.

5. The toxin immobilization particle of claim 1, wherein said toxins are selected from the group consisting of mercury, PCBs, chlorinated pesticides and polycyclic aromatic hydrocarbons.

6. A method of forming a toxin immobilization particle, comprising:
   a. condensing a polymer with a sulfide mixture to form a polysulfide-rubber polymer compound; and
   b. coating an activated carbon particle with said polysulfide-rubber polymer, wherein said polysulfide polymer coated activated carbon particle provides enhanced toxin adsorption.

7. The method according to claim 6, wherein said synthesizing said polymer in said sulfide mixture comprises using condensation polymerization between sodium tetrasulfide and 1,2-dichloroethane in water.

8. The method according to claim 6, wherein said activated carbon particle is a porous activated carbon particle.

9. The method according to claim 6, wherein said activated carbon particles have a size range up to 2 mm.

10. The method according to claim 6, wherein said polysulfide-rubber polymer coated activated carbon particle comprises a polymer-dose range of up to 1.64 grams of sulfur per gram of said activated carbon particles.

11. The method according to claim 6, wherein said coating said activated carbon particle with said polysulfide-rubber polymer comprises:
    a. refluxing a polysulfide-rubber polymer in toluene, wherein said polymer is dissolved;
    b. cooling said refluxed polysulfide-rubber polymer;
    c. adding said activated carbon particle to said cooled refluxed polysulfide-rubber polymer;
    d. mixing and refluxing polysulfide-rubber polymer with activated carbon;
    e. cooling said mixed and refluxed polysulfide-rubber polymer with activated carbon;
    f. mixing activated carbon particle in said cooled refluxed polysulfide polymer, wherein said particle is coated with said cooled refluxed polysulfide polymer; and
    g. collecting and drying said coated polysulfide polymer coated activated carbon particle.

12. The method according to claim 6, wherein levels of sulfur loading in said toxin immobilization particles are controlled by the polymer dose during said coating process.

* * * * *